Figure 1:
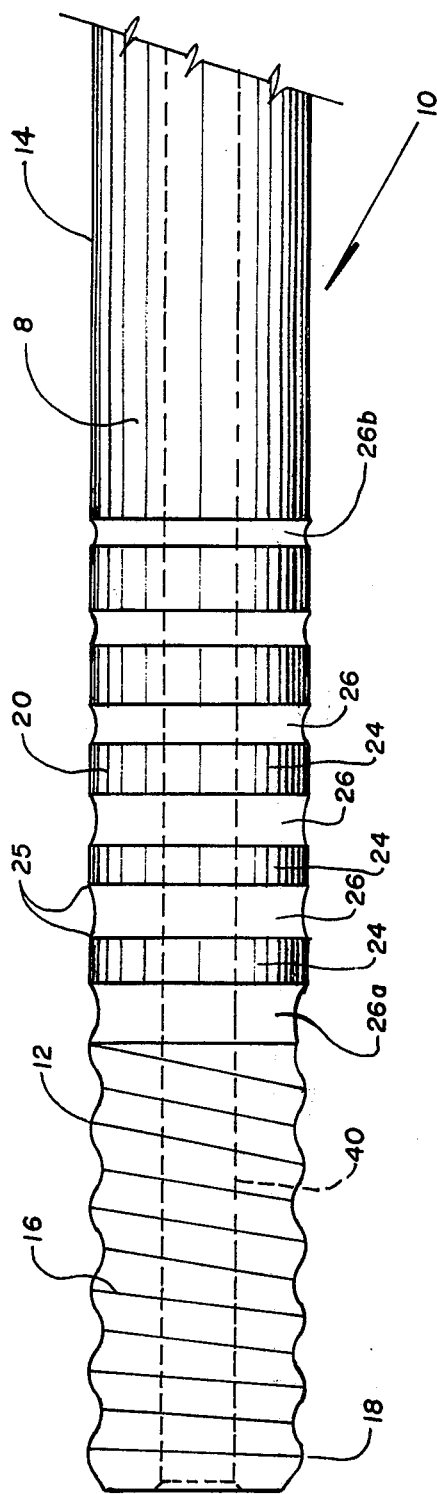

United States Patent [19]
Bailey et al.

[11] 3,966,341
[45] June 29, 1976

[54] DRILL STEEL

[75] Inventors: Edward A. Bailey, Newport; James F. Ordway, West Lebanon, both of N.H.

[73] Assignee: Joy Manufacturing Company, Pittsburgh, Pa.

[22] Filed: Dec. 16, 1974

[21] Appl. No.: 533,125

[52] U.S. Cl............................... 403/343; 403/307
[51] Int. Cl.² ............................................ F16B 7/18
[58] Field of Search ............ 285/390, 355; 403/343, 403/296, 333, 307; 85/46, 48

[56] References Cited
UNITED STATES PATENTS

| | | | |
|---|---|---|---|
| 2,641,488 | 6/1953 | Dunn et al. | 285/390 X |
| 3,574,373 | 4/1971 | LeDerf et al. | 403/296 |

FOREIGN PATENTS OR APPLICATIONS

| | | | |
|---|---|---|---|
| 58,553 | 9/1953 | France | 285/333 |

*Primary Examiner*—Andrew V. Kundrat

[57] ABSTRACT

A drill steel of the type employed in rock drilling and more particularly a drill steel having improved stress distribution and relief means.

9 Claims, 2 Drawing Figures

DRILL STEEL

In the art of rock drilling it is well known to employ elongated drill steels or rods for the drilling of deep holes in rock or other hard formations. Such drill steels have commonly comprised, for example an elongated rigid bar having one end portion adapted to be threadingly secured to the striking bar of a rock drill as by means of a well known coupling sleeve, and an opposed end portion similarly adapted to carry a drilling bit whereby in operation the drill steel transmits the drilling loads generated by such a rock drill to the bit for drilling holes as required. Often such a drill steel may be formed as a so-called long threaded steel by having the threaded portions extending from the ends thereof over a major part of the entire drill steel length such that the steel may be reworked to a shorter length and reused as the threads adjacent each end wear out and fail in use.

Although known threaded drill steels and other similarly formed members such as extension bars and striking bars have generally served the purposes intended, they have nonetheless often been subject to certain undesirable deficiencies. For example during use thereof intolerable stress concentrations may develop at the abrupt transition from a threaded region to a full diameter bar region and may precipitate premature failure of the drill steel. To overcome this deficiency some drill steels have been threaded continuously throughout their entire length to avoid the problem of the transition from a threaded zone to a full diameter zone. However, such continuously threaded steels may be somewhat weaker and more flexible overall than an equivalent full diameter drill steel and thus may not be able to sustain the high drilling speeds attainable with newer drills and considered desirable today for efficient drilling. Of course additional strength may be provided in a continuously threaded drill steel by designing to larger dimensions, but this in some cases would require the use of adaptors to fit conventionally sized cooperating elements and additionally would be needlessly wasteful of materials.

The present invention alleviates the hereinabove cited deficiencies by providing a drill steel with stress relief or distribution means in a transition portion intermediate adjacent threaded portions and full diameter bar portions. The stress distribution means of the present invention is comprised of a generally tapered and elongated transition zone which provides a gradual transition from a smaller diameter to a larger diameter region thereby precluding intolerable concentration of stresses at any one point intermediate the respective adjacent threaded and full diameter portions. Furthermore, according to this invention such transition zones are comprised of spaced apart stress bearing segments with protective means formed therebetween to protect such segments from physical damage thereby ensuring increased drill steel life.

Figure 2:
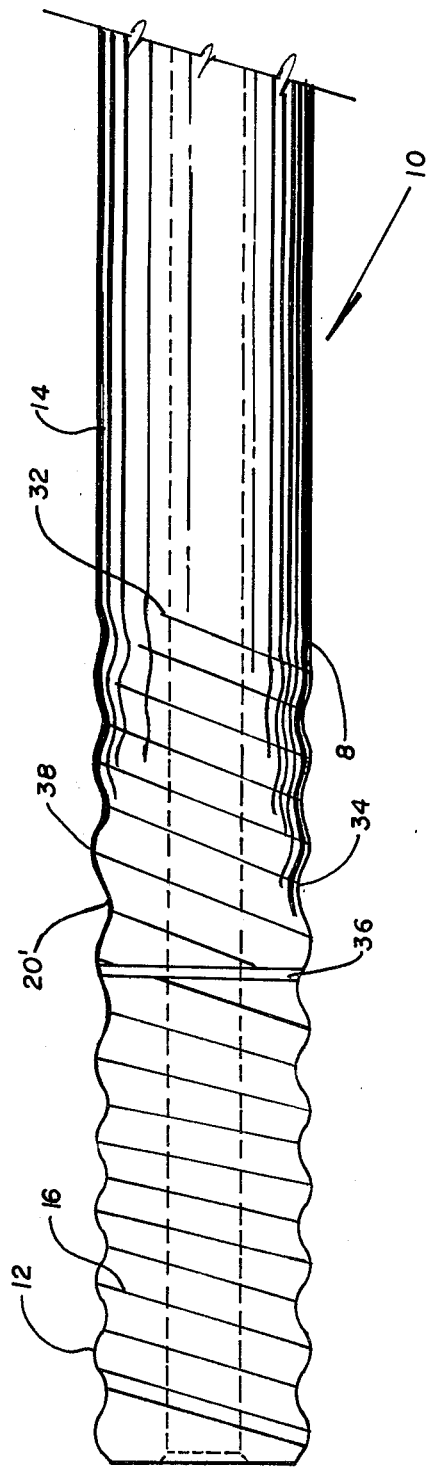

These and other objects and advantages of the present invention are more fully specified in the following description and figures in which:

FIG. 1 illustrates an end threaded drill steel including stress distribution means of this invention; and FIG. 2 illustrates a drill steel similar to that of FIG. 1 which incorporates an alternative embodiment of this invention.

There is generally indicated at 10 in FIG. 1 a threaded drill steel or rod of the type commonly used in rock drilling operations and including stress relief or distribution means according to the principles of the present invention. Of course it is to be understood from the outset that the steel 10 is but one possible embodiment of various threaded drill steels, extension bars, striking bars and the like which have commonly been adapted for drilling operations, and as such is not intended to unduly limit the scope of the invention described.

Accordingly, as shown in FIG. 1 drill steel 10 comprises a rigid and elongated cylindrical member 8 formed from any suitable material such as steel and including a full diameter bar portion 14 which is axially spaced from a threaded end portion 12. The portion 12 may comprise any known force-bearing rock drill thread configuration, for example well known force bearing rope threads 16 formed adjacent the axial extremity of member 8 as shown at 18 and extending axially inwardly therefrom toward the portion 14. In practice the portion 12 may coextend axially with a major portion of the member 8.

A known drilling bit or like implement (not shown) may be releasably secured by relatively few threads 16 adjacent axial end 18 of the member 8 and the opposed axial end of member 8 (not shown) may be disposed in axial abutment with the outermost end of a striking bar and releasably affixed thereto in similar fashion as by a well known cooperably threaded coupling sleeve. Commonly the steel 10 may additionally include a coaxial through bore 40 in member 8 for directing flushing and cooling fluid to the drill bit during drilling.

Extending longitudinally intermediate the portion 14 and portion 12 is a transition portion or stress relief zone 20 which illustrates one embodiment of the present invention.

To provide adequate stress relief the transition portion 20 preferably extends axially with respect to member 8 a distance equal to at least the full diameter of the member 8 as represented by the diameter of portion 14.

The zone 20 includes a plurality of axially spaced apart circumferential protective means shown as radially outwardly protruding lands 24, all of which have a diameter shown as being approximately equal to that of portion 14. Lands 24 are adapted to provide physical protection for a cooperable plurality of circumferentially and radially inwardly extending stress bearing groove means 26 disposed intermediate respective adjacent pairs of lands 24.

As shown, the grooves 26 are formed having concave profiles of constant radius, for example a radius of 9/32 inch, although it will of course be evident that a larger or smaller radius of differing radii may be employed. Additionally it is to be noted that the root diameters, which are taken at the deepest part of respective grooves 26, increase incrementally from a minimum diameter as in groove 26a adjacent threads 16, to a maximum diameter as in groove 26b adjacent portion 14. Such minimum and maximum root diameters may aproximate, respectively, the root diameter of threads 16 and the diameter of portion 14, for example. The root diameters of grooves 26 intermediate end grooves 26a and 26b increase incrementally from the diameter of 26a to that of 26b, for example in small steps such as 0.02 inches from one groove 26 to the next moving toward groove 26b such that the grooves 26 taken collectively form within the zone 20 a reduced diameter and generally cylindrical tapered stress relief means having the axially spaced full diameter lands 24 superimposed thereon as described. The taper of zone 20 as embodied by grooves 26 provides an axially extended stress relief region intermediate the threaded region 12 and the non-threaded full diameter region 14, and the spaced lands 24 shield the stress bearing grooves 26 recessed therebetween from contact with the bore hole walls thereby preventing the infliction of nicks, scratches and other physical damage within grooves 26 which could cause stress concentrations to develop therein and precipitate premature drill steel failure. It is noted that since the concave profile radii of the grooves are equal and the root diameter of the grooves progressively increases, the width of the respective grooves will necessarily decrease. The root diameter of the grooves are preferably equally spaced aong the transition portion, therefore, the respective lands 24 will necessarily increase in width in a direction from the threaded portion to the full diameter portion.

It should be observed here that the configuration described hereinabove ensures that axial bending stress imposed on zone 20 during drilling will be taken primarily by the smoothly curved root portions of grooves 26 rather than by upper flank portions thereof or by the lands 24. Accordingly, sharp corners 25 at the juncture of respective adjacent lands 24 and grooves 26 are permissible, although such corners may alternatively be rounded.

In FIG. 2 there is illustrated an alternative embodiment of this invention in the drill steel 10 which, as described hereinabove includes the member 8 having the portion 14 thereof axially spaced from the threaded portion 12, and further includes a transition portion 20' extending coaxially intermediate the portions 12 and 14. According to this embodiment the threads 16 of portion 12 also extend continuously throughout the portion 20' to the portion 14. In portion 12 the threads 16 are of uniformly full depth, the diameter of root portion 34 thereof being equal at all points. However, in the portion 20' the diameter of root 34 gradually increases from a minimum adjacent a thin cylindrical juncture 36 between portions 12 and 20', to a maximum at a point adjacent the portion 14. Preferably, the diameter of root 34 in portion 20' moving toward portion 14 gradually approaches the diameter of portion 14 as shown until the thread 16 blends smoothly into the portion 14 as at 32. Of course it is to be understood that the portion 36 is included for purposes of illustrative clarity and is not necessary to the present invention. In fact, a preferable alternative would have the thread 16 extending smoothly and continuously across the juncture 36 with only the change from constant diameter to increasing diameter of root 34 to indicate the juncture of portions 12 and 20'.

Thus, in this as in the previously described embodiment a tapering stress relief means in portion 20' is provided by the root 34 and physical protection therefor is provided by the corresponding adjacent crest portion 38 of thread 16 which extends radially outwardly whereby root portion 34 is recessed radially inwardly therefrom. It is to be noted that if thread 16 is formed by a commonly employed rolling process, the crest 38 may assume a diameter slightly larger than that of portion 14. However, as a practical consideration the crest 38 diameter may be viewed as being substantially no greater than the diameter of portion 14 for the purposes of this invention.

According to the recitations hereinabove there is provided an improved drill steel having generally tapered stress relief means disposed intermediate respective adjacent reduced diameter threaded portions and full diameter bar portions, and including spaced apart protective means extending radially outwardly from such tapered stress relief means to protect stress bearing regions from physical damage which might otherwise precipitate premature drill steel failure.

Notwithstanding the reference hereinabove to certain preferred embodiments of the invention, it is to be understood that the invention may be practiced in various alternative embodiments and with numerous modifications without departing from the broad spirit and scope thereof. For example: grooves 26 need not be of uniform radius nor need they increase in diameter in uniform increments from one groove to the next; the protective means shown as lands 24 may extend longitudinally upon a tapered stress relief means in the manner of longitudinal driving splines; and the like.

These and other embodiments and modifications having been envisioned and anticipated by the inventors it is requested that this invention be interpreted broadly and limited only by the scope of the claims appended hereto.

What is claimed is:

1. An elongated, generally uniformly cylindrical drill steel for use in the drilling of holes in rock or like hard formations comprising: a full diameter portion; at least one cylindrical end portion being externally threaded along the axial length thereof and being axially spaced from said full diameter portion; the threads of said one end portion being force-bearing rock drill threads; a transition portion being externally grooved and extending between said full diameter portion and said end portion; said transition portion having groove root diameters which increase from a minimum nearest said end portion to a maximum nearest said full diameter portion; the minimum groove root diameter being approximately equal to the root diameter of the rock drill thread adjacent thereto and the maximum groove root diameter being slightly less than the diameter of said full diameter portion; and the axial length of said transition portion being at least equal to the diameter of said full diameter portion.

2. A drill steel as specified in claim 1 wherein: said transition portion contains at least one helical groove.

3. A drill steel as specified in claim 2 wherein: said transition portion contains a single helical groove; and the juncture between said threads and said groove is smooth and continuous.

4. A drill steel as specified in claim 1 wherein said rock drill threads are rope threads.

5. A drill steel as specified in claim 1 wherein each end portion thereof is externally threaded with force-bearing rock drill threads and a transition portion extends between said full diameter portion and each respective end portion.

6. A drill steel as specified in claim 1 wherein: the maximum diameter of said end portion and said transition portion is approximately equal to the diameter of said full diameter portion.

7. A drill steel as specified in claim 1 wherein: said transition portion contains a plurality of axially spaced, annular grooves.

8. A drill steel as specified in claim 7 wherein: the width of said grooves progressively decreases from a maximum nearest said end portion to a minimum nearest said full diameter portion.

9. A drill steel as specified in claim 2 wherein: the external radii of said grooves are all equal.

* * * * *

UNITED STATES PATENT OFFICE
CERTIFICATE OF CORRECTION

PATENT NO. : 3,966,341
DATED : June 29, 1976
INVENTOR(S) : Edward A. Bailey and James F. Ordway It is certified that error appears in the above-identified patent and that said Letters Patent are hereby corrected as shown below:

Claim 9 line 1 delete "2" and insert --7--.

Signed and Sealed this

Twenty-sixth Day of October 1976

[SEAL]

Attest:

RUTH C. MASON
*Attesting Officer*

C. MARSHALL DANN
*Commissioner of Patents and Trademarks*